UNITED STATES PATENT OFFICE.

GEORGES STRAUSS, OF PARIS, FRANCE, ASSIGNOR TO SOCIÉTÉ ANONYME LA COMPAGNIE GÉNÉRALE D'ELECTRO-CHIMIE DE BOZEL, OF PARIS, FRANCE, A CORPORATION OF FRANCE.

MANUFACTURE OF METALLIC SILICIDS.

964,459. Specification of Letters Patent. Patented July 12, 1910.

No Drawing. Original application filed April 16, 1908, Serial No. 427,433. Divided and this application filed October 26, 1909. Serial No. 524,665.

*To all whom it may concern:*

Be it known that I, GEORGES STRAUSS, a citizen of the Republic of France, residing at Paris, France, have invented Improvements in the Manufacture of Metallic Silicids, of which the following is a specification.

The present application is a division of my application Serial No. 427,433, filed April 16, 1908.

This invention has for objects an improved process of producing metallic silicids, particularly alkali earthy silicids.

The known processes of producing metallic silicids are subject to serious inconveniences which are avoided according to this invention. By way of example take the production of calcium silicid. It is well known that by heating a mixture, in definite proportions, of lime, silica and carbon, in an electric furnace there is obtained calcium silicid ($CaSi_2$) according to the following equation:—

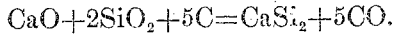

This method of production however is subject to a serious inconvenience in that the silica and the lime have a tendency to unite directly and to form silicates of lime which are difficult to reduce; moreover the yield of calcium silicid is thereby considerably diminished. Such process is not therefore practically successful.

Now in the production of calcium silicid according to this invention the calcium or the silicon is employed in such a form that it cannot give rise to the production, in the presence of the silica or the lime respectively, of a silicate or some other combination which is difficult to reduce.

In a suitable way of carrying out this invention the calcium is preferably employed in the form of calcium carbid in place of lime and the silicon in the form of metallic silicon in place of silica. The reaction takes place according to the following equations:—

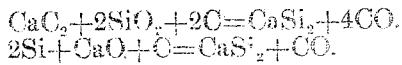

The improved process which prevents the formation of silicates which are difficult to reduce, is moreover easy to carry out. Practically it suffices to employ for this purpose the calcium carbid of commerce, which only contains, as is well known, about 85 (eighty-five) per cent. of calcium carbid and 15 (fifteen) per cent. of free lime, and in the second case the silicon prepared in an electric furnace.

Although it is true that with the carbid of calcium of commerce the formation of silicates of lime is not absolutely avoided nevertheless, since the necessary calcium introduced in the form of lime is only in a very small proportion in comparison with that introduced in the form of calcium carbid ($CaC_2$) it results that the production of silicates of lime is negligible.

Experiments made with calcium silicid have shown that this metallic silicid is capable of replacing with advantage the aluminium usually employed in steel works for the purpose of preventing the formation of blow holes in steel ingots. The advantages ensuing from such application are, in addition to the economy secured by the very low price of calcium silicid, very great rapidity of reaction and the suppression of the undesirable "shortness" which aluminium communicates to ingots of steel.

I do not claim broadly herein the process of producing a metallic silicid by a carbon-silicon-calcium mixture adapted to prevent the formation of a difficultly reducible silicate; nor the specific form of carrying out the process by employing metallic silicon and lime, said process in its broad phase and in the specific method mentioned being claimed in my application Serial No. 427,433 above mentioned.

I claim herein:

1. The process of producing calcium silicid which consists in heating an intimate mixture containing carbon, silica and calcium carbid adapted to substantially prevent the formation of a difficultly reducible silicate, substantially as described.

2. The process of producing calcium silicid which consists in heating an intimate mixture containing carbon, silica and calcium carbid of commerce adapted to substantially prevent the formation of a difficultly reducible silicate, substantially as described.

3. The herein described process of producing a compound containing an alkaline earth metal and silicon, which comprises heating a metallic carbid of an alkaline earth with silica under proper conditions to produce a compound containing calcium and silicon.

4. The herein described process of producing a compound containing an alkaline earth metal and silicon, which comprises heating a metallic carbid of an alkaline earth with silica in the electric arc.

5. The herein described process of producing a compound, containing an alkaline earth metal and silicon, which comprises heating calcium carbid with silica.

6. The herein described process of producing a compound, containing an alkaline earth metal and silicon, which comprises heating together calcium carbid, silica and carbon.

7. The herein described process of producing a compound containing an alkaline earth metal and silicon, which comprises subjecting a mixture of calcium carbid, silica and carbon to the action of the electric arc.

8. The herein described process of producing a metallic silicid, which consists in causing carbon to react upon a mixture containing silica and a metallic compound, the latter being employed in a chemical form adapted to prevent the formation of a difficultly reducible metallic silicate, when the whole is heated together in a furnace.

9. The herein described process of producing a metallic silicid which consists in causing carbon to react upon a mixture containing silica and a metallic compound, the latter in the form of a metallic carbid, whereby the formation of a difficultly reducible metallic silicate is prevented when the whole is heated together in a furnace.

10. The herein described process of producing an alkaline earth silicid, which consists in causing carbon to react upon a mixture containing silica and an alkaline earth compound, the latter being employed in a chemical form adapted to prevent the formation of a difficultly reducible alkaline earth silicate, when the whole is heated together in a furnace.

11. The herein described process of producing an alkaline earth silicid, which consists in causing carbon to react upon a mixture containing silica and an alkaline earth compound, the latter in the form of an alkaline earth carbid whereby the formation of a difficultly reducible alkaline earth silicate is prevented when the whole is heated together in a furnace.

12. The herein described process of producing calcium silicid, which consists in causing carbon to react upon a mixture containing silica and a calcium compound, the latter being employed in a chemical form adapted to prevent the formation of a difficultly reducible lime silicate, when the whole is heated together in a furnace.

13. The herein described process of producing calcium silicid, which consists in causing carbon to react upon a mixture containing silica and a calcium compound, the latter in the form of calcium carbid, whereby the formation of a difficultly reducible lime silicate is prevented when the whole is heated together in a furnace.

In testimony whereof I have signed my name to this specification, in the presence of two subscribing witnesses.

GEORGES STRAUSS.

Witnesses:
BENJAMIN BLOCHE,
H. C. COXE.